Sept. 2, 1958 C. A. BYERS 2,850,118
BRAKE HAVING A NON-FUSING BRAKE ELEMENT
Filed Feb. 23, 1956 2 Sheets-Sheet 1

INVENTOR.
CLIFTON A. BYERS
BY
R. L. Miller
ATTORNEY

Sept. 2, 1958     C. A. BYERS     2,850,118
BRAKE HAVING A NON-FUSING BRAKE ELEMENT
Filed Feb. 23, 1956     2 Sheets-Sheet 2

*INVENTOR.*
CLIFTON A. BYERS
BY
*R. L. Miller*
ATTORNEY 2,850,118

BRAKE HAVING A NON-FUSING BRAKE ELEMENT

Clifton A. Byers, Cuyahoga Falls, Ohio, assignor to The Goodyear Tire & Rubber Company, Akron, Ohio, a corporation of Ohio Application February 23, 1956, Serial No. 567,297

3 Claims. (Cl. 188—71)

This invention relates to brakes and brake elements therefor and is especially useful in the construction of brakes for aircraft or vehicles.

In the construction of brakes for airplanes where the plane lands at very high speeds and great amounts of energy must be absorbed within a short interval of time, great difficulty has been experienced in finding brake elements which could absorb energy so rapidly without becoming fused so as to adhere to cooperating brake elements.

Objects of the present invention are to provide a brake element of metal having a coating thereon which will provide a good friction surface for engaging a cooperating brake element, which will remain in place on the brake element during use, and which will not fuse to the cooperating brake element.

These and other objects will be apparent from the following description and the accompanying drawings.

Figure 1:
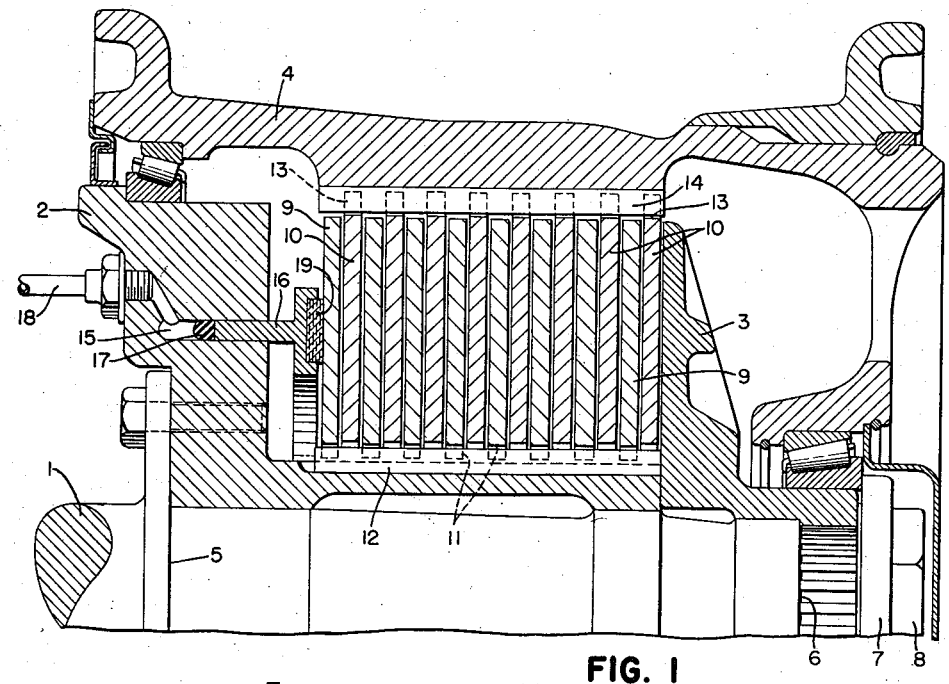
Fig. 1 is an axial cross-sectional view of a brake constructed in accordance with and embodying the invention, parts being broken away.
Figure 2:
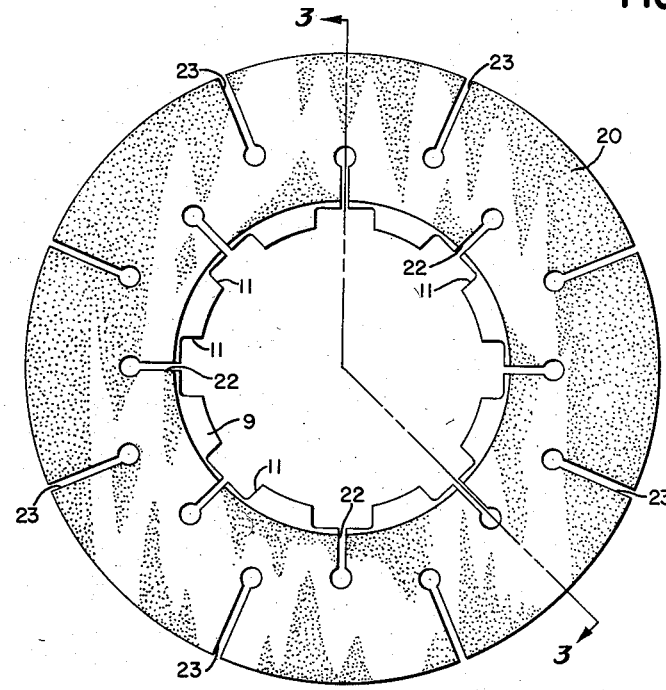
Fig. 2 is a face view of one of the stationary brake discs.
Figure 4:
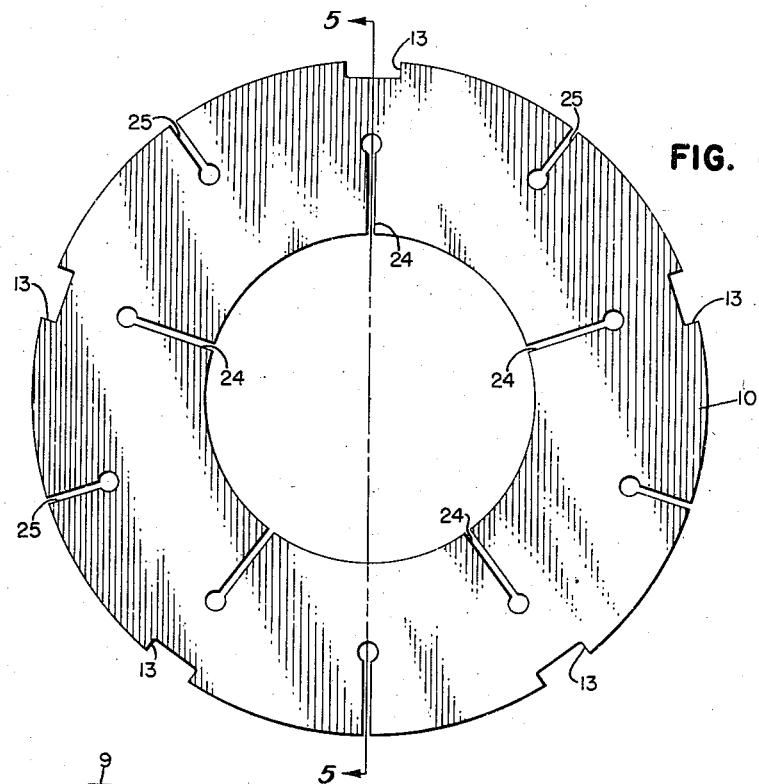
Fig. 4 is a face view of one of the rotatable brake discs.
Figure 3:
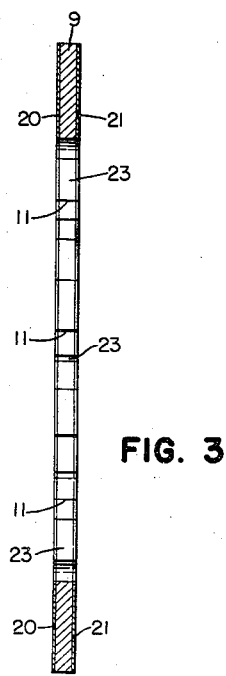
Fig. 3 is a sectional view thereof, taken on line 3—3 of Fig. 2.
Figure 5:
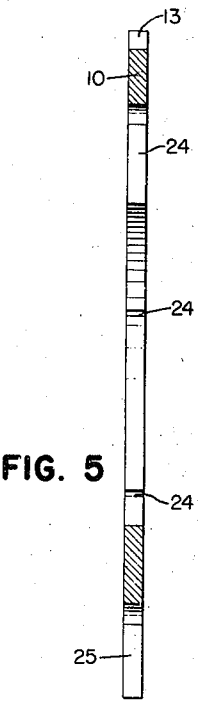
Fig. 5 is a sectional view thereof taken on line 5—5 of Fig. 4.

Referring to the drawings, and first to Fig. 1 thereof, this shows a multiple disc brake having a nonrotatable shaft 1 upon which are secured against rotation fixed brake members 2 and 3 and a rotatable brake member 4 rotatable thereabout. The shaft 1 is formed with a shoulder 5 against which the fixed brake member 2 is seated and a second shoulder 6 against which the other fixed brake member is seated and held by a collar 7 and nut 8 threaded on the shaft. Shoulders 5 and 6 hold the fixed brake members in axially spaced apart relation.

Between fixed brake members 2 and 3 are a plurality of brake discs 9 and these are arranged in intercalated relation with a plurality of rotating brake discs 10 carried by the rotating brake member 4. For retaining discs 9 against rotation, they are each formed with a plurality of keyways 11 for engaging a plurality of keys 12 on the shaft 1. The keys may be serrations integral with the shaft and the discs 9 are free to float axially of the shaft.

For rotating the discs 10, the discs are formed with keyways 13 about their outer peripheries to engage keys 14 secured to the rotatable brake member 4. The keys permit the discs 4 to float axially of the brake.

For applying braking pressure, a cylinder in the form of an axially directed annular groove 15 is provided in the fixed brake member 2 and an annular piston 16 is mounted therein for axial movement, a sealing ring 17 being provided to seal the joint. A pipe 18 provides fluid under pressure to the cylinder to force the annular piston 16 outwardly toward the brake discs. The piston 16 terminates in an annular pressure pad 19 which engages the first stationary brake disc 9 and presses all the discs against the brake member 3.

Brakes of this type, especially where used for absorbing a large amount of energy in short period of application, as where the brake is employed to bring an airplane to a stop from a landing at high speed, convert mechanical energy to heat at a high rate and it has been found that the discs tend to fuse together. To provide against such fusing of the brake discs, one set of brake discs are provided with layers 20, 21 of sintered metallic material on their opposite working faces. For example, in the construction chosen for illustration of the invention, the stationary plates 9 are each provided with the coating whereas the rotatable discs 10 are of uncoated steel. However, it is within the invention to provide the rotatable plates with such layers of coating in which case the stationary discs are not coated. Also, it would be within the invention to provide a facing layer of non-fusing material on only one face of each of the rotary and stationary discs arranging them so that a facing on one disc cooperates with an adjoining disc surface free from facing material.

As the non-fusing facing layer should be firmly attached to the disc on which it is mounted and should not adhere to the cooperating brake disc, the brake disc on which the non-fusing layer is mounted is of metal to which the nonfusing layer may be bonded and the opposing brake disc is made of metal that will not fuse to the non-fusing layer in use. For mounting, the non-fusing layers 20, 21 the supporting brake disc is made, for example, of Yoloy "E" (HSX) sheet steel, a material having the following composition:

| | |
|---|---|
| Nickel | .5–1.0 |
| Copper | .25–.6 |
| Carbon | .10–.12 |
| Iron | Balance |

For providing the non-fusing surface layers, a powdered metal composition is prepared having the following composition:

| | Percent |
|---|---|
| Carbon | 3 to 8 |
| Molybdenum | .25 to .75 |
| Manganese | .15 to .6 |
| Nickel | .05 to .15 |
| Silicon | .05 to .20 |
| Chromium | .05 to .20 |
| Iron | Balance |

The powdered materials are pressed cold to provide a cake slightly thicker than the desired non-fusing layer. This cake is superimposed upon a brake disc of steel and is united thereto by sintering the composition in place on the disc.

A typical non-fusing layer of sintered material was found to be of the following analysis:

| | |
|---|---|
| Carbon | 4.40 |
| Molybdenum | .50 |
| Manganese | .25 |
| Nickel | .095 |
| Silicon | .11 |
| Chromium | .10 |
| Iron | Balance |

After sintering the face layers, the disc may be heat treated if desired to give it any special properties. The disc is then ground to the desired thickness.

Such a disc has been found to operate without fusing where the opposing disc is of chrome-molybdenum-vanadium steel, such as Timken 17–22 AV steel, even at temperatures as high as 2000 degrees F.

While certain compositions have been found to give excellent results, it is believed that other compositions may give equally good results and that the invention is not limited to an exact composition of the sintering material or of the metal of which the discs are made, and the invention appears to be in providing a sintering mixture which will fuse to its supporting disc and will not fuse to an opposing metal disc in use.

To provide against cupping or other distortion of the discs during use due to heating thereof, each disc 9 is formed with radial slits 22 extending to the inner periphery thereof and 23 extending to the outer periphery thereof, and each disc 10 is formed with inwardly extending slits 24 and outwardly extending slits 25.

While a certain representative embodiment and details have been shown for the purpose of illustrating the invention, it will be apparent to those skilled in this art that various changes and modifications may be made therein without departing from the spirit or scope of the invention.

I claim:

1. A brake having rotatable and nonrotatable cooperating brake elements, at least one of said elements comprising a body of ferrous metal having as an ingredient a small percentage of copper, and a friction facing of sintered metal composition including molybdenum and manganese mounted directly on said body and used thereto and a cooperating brake element of chromium, molybdenum and vanadium positioned for frictional engagement with the friction facing.

2. A brake having rotatable and nonrotatable cooperating brake discs, at least one of said discs comprising a body of steel having a nickel and a copper content of less than two percent, a friction facing of sintered metal composition including molybdenum, manganese and iron mounted directly thereon and fused thereto, and a cooperating brake element of steel alloyed with chrome, molybdenum and vanadium adapted to be frictionally engaged with said facing.

3. A brake having rotatable and nonrotatable cooperating brake discs, at least one of said discs comprising a body of steel containing a nickel and a copper content of less than two percent, friction facings of sintered metal composition including molybdenum, manganese and iron fused directly to opposite sides thereof, and said facings being presented for frictional engagement with faces of cooperating steel brake elements alloyed with chrome, molybdenum and vanadium and being resistant to fusing thereto.

References Cited in the file of this patent

UNITED STATES PATENTS

| | | |
|---|---|---|
| 2,058,039 | Schwartz | Oct. 20, 1936 |
| 2,089,080 | Valentine | Aug. 3, 1937 |
| 2,096,924 | Schwarzkopf | Oct. 26, 1937 |
| 2,359,361 | Gleszer et al. | Oct. 3, 1944 |
| 2,379,767 | Valentine | July 3, 1945 |
| 2,408,430 | Lowey et al. | Oct. 1, 1946 |
| 2,519,865 | Wellman | Aug. 22, 1950 |

UNITED STATES PATENT OFFICE
CERTIFICATE OF CORRECTION

Patent No. 2,850,118 September 2, 1958

Clifton A. Byers

It is hereby certified that error appears in the printed specification of the above numbered patent requiring correction and that the said Letters Patent should read as corrected below.

Column 3, line 27, for "used" read -- fused --.

Signed and sealed this 11th day of November 1958.

(SEAL)
Attest:

KARL H. AXLINE
Attesting Officer

ROBERT C. WATSON
Commissioner of Patents